(12) United States Patent
Xianyu et al.

(10) Patent No.: US 11,698,662 B2
(45) Date of Patent: Jul. 11, 2023

(54) FOLDABLE MECHANISM AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Wenxu Xianyu, Hubei (CN); Zhuo Zhang, Hubei (CN); Zikang Feng, Hubei (CN)

(73) Assignee: WUHAN CHINA STAR OPTOELECTRONICS SEMICONDUCTOR DISPLAY TECHNOLOGYCO., LTD., Hubei (CN)

( * ) Notice: Subject to any disclaimer, the term of this patent is extended or adjusted under 35 U.S.C. 154(b) by 348 days.

(21) Appl. No.: 17/053,140

(22) PCT Filed: Jun. 29, 2020

(86) PCT No.: PCT/CN2020/098729
§ 371 (c)(1),
(2) Date: Nov. 5, 2020

(87) PCT Pub. No.: WO2021/232542
PCT Pub. Date: Nov. 25, 2021

(65) Prior Publication Data
US 2022/0283608 A1    Sep. 8, 2022

(30) Foreign Application Priority Data

May 19, 2020   (CN) .......................... 202010424334.7

(51) Int. Cl.
*G06F 1/16*    (2006.01)
*F16C 11/04*    (2006.01)

(52) U.S. Cl.
CPC ............ *G06F 1/1652* (2013.01); *F16C 11/04* (2013.01); *G06F 1/1641* (2013.01); *G06F 1/1673* (2013.01); *G06F 1/1681* (2013.01)

(58) Field of Classification Search
CPC combination set(s) only.
See application file for complete search history.

(56) References Cited

U.S. PATENT DOCUMENTS 7,446,757 B2 * 11/2008 Mochizuki ............ G06F 1/1641
345/905
8,082,631 B2 * 12/2011 Eromaki ............... G06F 1/1681
16/370

(Continued)

FOREIGN PATENT DOCUMENTS

CN    203150022 U    8/2013
CN    103501383 A    1/2014

(Continued)

*Primary Examiner* — Lisa Lea-Edmonds
(74) *Attorney, Agent, or Firm* — PV IP PC; Zhigang Ma; Wei Te Chung

(57) ABSTRACT

A foldable mechanism and a display device including the foldable mechanism are disclosed. The foldable mechanism includes a first folding hinge, a second folding hinge, a third folding hinge, a fourth folding hinge, a first casing, a second casing, a third casing, and a fourth casing. The foldable mechanism is multifunctional and has both inward bending and outward bending functions, so that the display device can operate in three display states: a tablet display state, a mobile phone display state, and a notebook display state.

18 Claims, 5 Drawing Sheets

(56) References Cited

U.S. PATENT DOCUMENTS

| | | | | |
|---|---|---|---|---|
| 8,539,705 | B2* | 9/2013 | Bullister | G06F 1/1615 361/679.04 |
| 9,179,559 | B1* | 11/2015 | Kim | H05K 5/0004 |
| 9,720,455 | B2* | 8/2017 | Jang | G06F 1/1679 |
| 10,852,769 | B2* | 12/2020 | Yildiz | G06F 1/1681 |
| 10,909,889 | B2* | 2/2021 | Lee | G09F 9/301 |
| 11,076,495 | B2* | 7/2021 | Cromer | E05D 7/00 |
| 11,263,932 | B2* | 3/2022 | Ko | G06F 1/1652 |
| 11,449,096 | B2* | 9/2022 | Zhang | G06F 1/1681 |
| 11,455,916 | B2* | 9/2022 | Lee | G06F 1/1652 |
| 11,495,148 | B2* | 11/2022 | Lee | G06F 1/1641 |
| 2004/0052044 | A1* | 3/2004 | Mochizuki | G06F 1/1616 361/679.09 |
| 2007/0279315 | A1* | 12/2007 | Laves | G06F 1/1677 345/1.1 |
| 2010/0041439 | A1* | 2/2010 | Bullister | G06F 1/165 455/566 |
| 2014/0196253 | A1 | 7/2014 | Song et al. | |
| 2015/0062525 | A1* | 3/2015 | Hirakata | G06F 1/1641 349/158 |
| 2017/0220072 | A1 | 8/2017 | Chen | |
| 2020/0364021 | A1* | 11/2020 | Park | H04N 5/225251 |
| 2021/0134192 | A1* | 5/2021 | Lee | G09F 9/301 |
| 2022/0283608 | A1* | 9/2022 | Xianyu | G06F 1/1641 |
| 2022/0294886 | A1* | 9/2022 | Seo | G09G 3/3208 |

FOREIGN PATENT DOCUMENTS

| | | |
|---|---|---|
| CN | 103926979 A | 7/2014 |
| CN | 104867406 A | 8/2015 |
| CN | 105867533 A | 8/2016 |
| CN | 107024963 A | 8/2017 |
| CN | 207302508 U | 5/2018 |
| CN | 110671422 A | 1/2020 |
| CN | 111416893 A | 7/2020 |
| WO | 2010019466 A1 | 2/2010 |

* cited by examiner

FOLDABLE MECHANISM AND DISPLAY DEVICE

BACKGROUND OF INVENTION

1. Field of Invention

The present invention relates to a technical field of displays, and particularly to, a foldable mechanism and a display device.

2. Related Art

Development of electronic devices has satisfied our spiritual and material needs, especially miniaturized electronic devices, such as mobile phones and notebook computers have been widely used and can be conveniently carried in person. In addition, electronic devices designed with foldable structures can achieve the purpose of convenient carry when they are in standby mode or being delivered, and can be expanded for using each functional interface at the same time to meet users' diverse needs. Since foldable structures are often required to be rotatable in multiple rotation directions, it often requires a lot of components to achieve functions of multiple angle rotation, thereby causing rotation structures to be much more complicated.

Current organic light-emitting diode (OLED) electronic devices have gained wide attention due to their bendable and foldable characteristics. Folding types of current major foldable structures provided for OLED devices are classified into an inward bending type and an outward bending type. However, conventional foldable structures still cannot meet requirements for multifunctional use.

SUMMARY OF INVENTION

An object of the present invention is to provide a foldable mechanism and a display device to overcome a problem that folding types of conventional organic electroluminescent diode electronic devices cannot effectively meet requirements for multifunctional use.

In order to achieve the above-mentioned object, the present invention provides a foldable mechanism, comprising a first folding hinge disposed along a first direction; a second folding hinge disposed in the same direction in which the first folding hinge is disposed; a third folding hinge disposed along a second direction, wherein the second direction intersects the first direction; a fourth folding hinge disposed in the same direction in which the third folding hinge is disposed; a first casing pivotally connected to the first folding hinge and the third folding hinge; a second casing pivotally connected to the second folding hinge and the third folding hinge; a third casing pivotally connected to the first folding hinge and the fourth folding hinge; and a fourth casing pivotally connected to the second folding hinge and the fourth folding hinge.

Further, the first folding hinge and the second folding hinge are spaced apart from each other, the third folding hinge and the fourth folding hinge are spaced apart from each other, and a connection portion or a gap is provided at a location where the first direction and the second direction intersect each other.

Further, the connection portion is a flexible connection block, and the flexible connection block is made of a material comprising a flexible metal or rubber.

Further, the first folding hinge has a length less than or equal to that of the first casing or the third casing extending in a direction along the first folding hinge; the second folding hinge has a length less than or equal to that of the second casing or the fourth casing extending in a direction along the second folding hinge; the third folding hinge has a length less than or equal to that of the first casing or the second casing extending in a direction along the third folding hinge; and the fourth folding hinge has a length less than or equal to that of the third casing or the fourth casing extending in a direction along the fourth folding hinge.

Further, the first folding hinge and the second folding hinge are configured to bend in a same direction, and the third folding hinge and the fourth folding hinge are configured to bend in a same direction.

Further, each of the first folding hinge, the second folding hinge, the third folding hinge, and the fourth folding hinge comprises a plurality of rotating shafts interconnected with each other, wherein the rotating shafts are disposed in parallel with each other and are arranged in such a way that a transition arc is formed by the rotating shafts after the foldable mechanism bends.

Further, a bending angle of each of the first folding hinge, the second folding hinge, the third folding hinge, and the fourth folding hinge ranges from 90 to 170 degrees.

Further, each of the first folding hinge, the second folding hinge, the third folding hinge, and the fourth folding hinge has torsion against gravity of each of the first casing, the second casing, the third casing, and the fourth casing, so that the first casing, the second casing, the third casing, and the fourth casing remain positions relative to each other after the foldable mechanism is bent.

The present invention further provides a display device comprising the above-mentioned foldable mechanism.

Further, the display device further comprises a flexible display disposed on at least a surface of the foldable mechanism; wherein the flexible display is provided in a tablet display state when the first folding hinge, the second folding hinge, the third folding hinge, and the fourth folding hinge are in a flat state; the flexible display is provided in a dual-screen mobile phone display state when the first folding hinge and the second folding hinge are in the flat state and the third folding hinge and the fourth holding hinge are bent outwardly, such that the first casing and the second casing are folded up to be attached to each other and the third casing and the fourth casing are folded up to be attached to each other; and the flexible display is provided in a notebook display state when the first folding hinge and the second folding hinge are bent inwardly and the third folding hinge and the fourth folding hinge are in the flat state, wherein the flexible display corresponding to the first casing and the second casing is provided to display a virtual keyboard, and the flexible display corresponding to the third casing and the fourth casing is provided for image displaying.

Further, an angle sensor is provided in each of the first folding hinge and the second folding hinge, wherein when the first folding hinge and the second folding hinge are bent from the tablet display state to the notebook display state, the angle sensors are configured to transmit a control signal to the flexible display, so that the flexible display corresponding to the first casing and the second casing is provided to display the virtual keyboard.

The present invention has advantageous effects as follows: the present invention provides a foldable mechanism and a display device. The foldable mechanism has both inward bending and outward bending functions, so that the display device can operate in three display states: a tablet display state, a mobile phone display state, and a notebook display state. The foldable mechanism increases the diversity of use modes and is configured with less components and a simple structure so that users' requirements for multi-angle bending of the display device can be met, thereby fulfilling multifunctional applications, and improving user experience.

DESCRIPTION OF PREFERRED EMBODIMENTS

Figure 1:
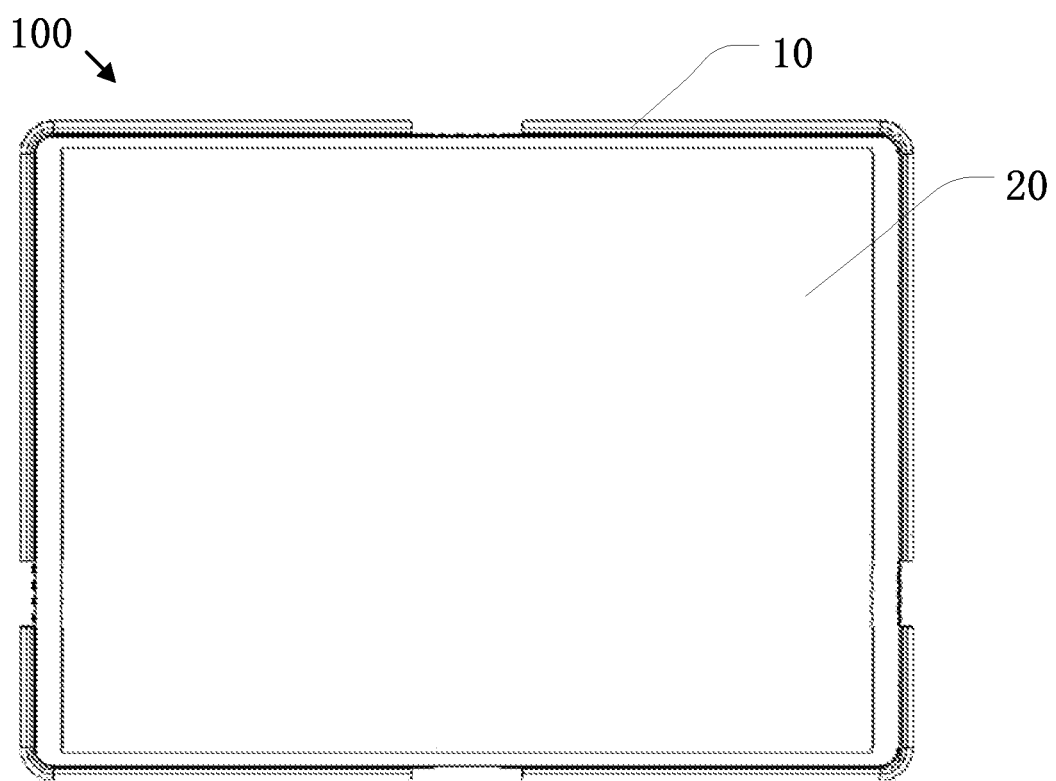
FIG. 1 is a schematic front plan view showing a structure of a display device in a tablet display state in accordance with an embodiment of the present invention.

The technical solutions in the embodiments of the present application will be clearly and completely described below in conjunction with the drawings in the embodiments of the present application. Obviously, the embodiments as described are only a part of the embodiments of the present application, rather than all the embodiments. Based on the embodiments in this application, all other embodiments obtained by those skilled in the art without creative work fall within the protection scope of this application.

The following embodiments are referring to the accompanying drawings for exemplifying specific implementable embodiments of the present invention. Directional terms described by the present invention, such as upper, lower, front, back, left, right, inner, outer, side, etc., are only directions by referring to the accompanying drawings, and thus the used directional terms are used to describe and understand the present invention, but the present invention is not limited thereto. In the drawings, units with similar structures are indicated by the same reference numerals.

The drawings of the present invention are only used to illustrate the relative position relationship and connection relationship of structures, and the layer thickness of some parts is exaggerated to facilitate understanding. The layer thickness in the drawings does not represent the proportional relationship of the actual layer thickness.

Referring to FIGS. 1 to 9. An embodiment of the present invention provides a display device 100 includes a foldable mechanism 10. The foldable mechanism 10 has both inward bending and outward bending functions, so that the display device 100 can operate in three display states: a tablet display state, a mobile phone display state, and a notebook display state. The foldable mechanism 10 increases the diversity of use modes and is configured with less components and a simple structure in such a way that users' requirements for multi-angle bending of the display device 100 can be met, thereby fulfilling multifunctional applications and improving user experience.

In this embodiment, the display device 100 further includes a flexible display 20 disposed on two side surfaces of the foldable mechanism 10.

Figure 2:
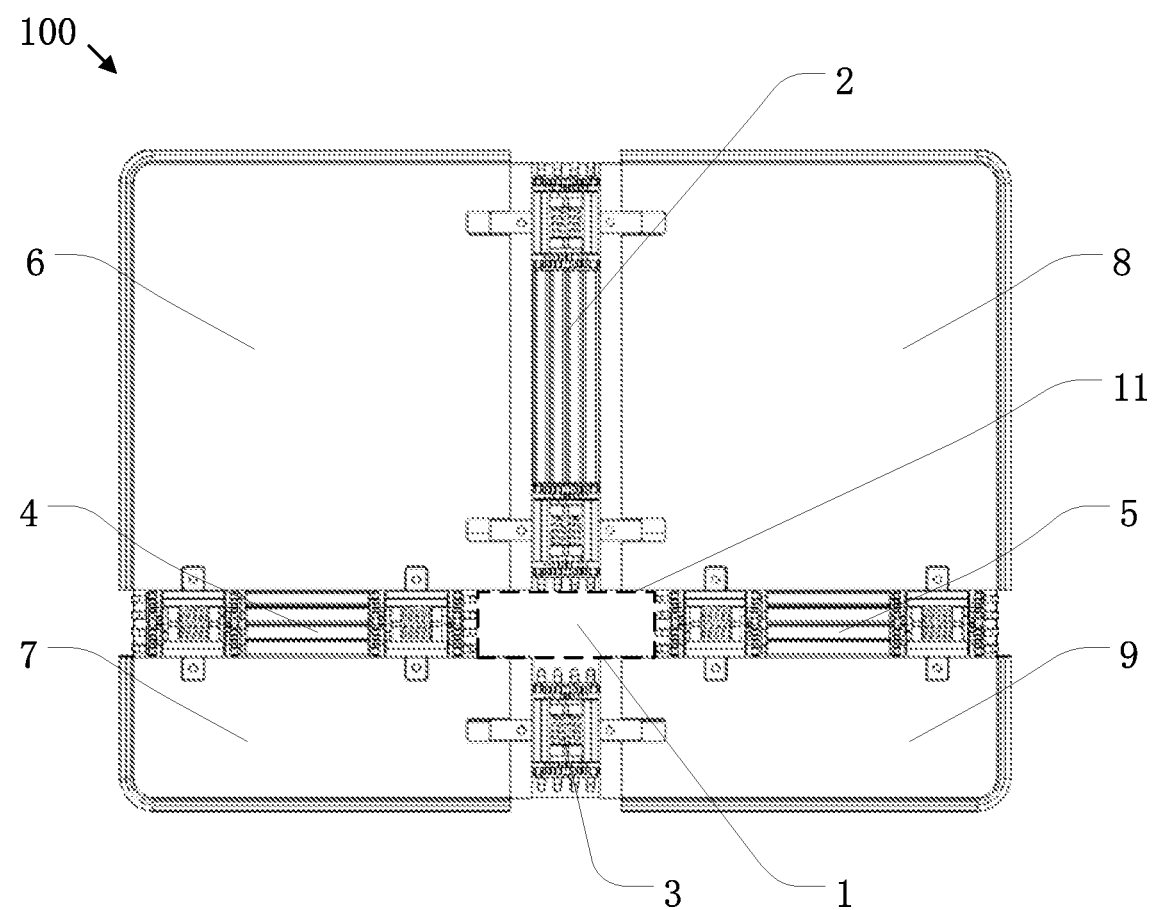
FIG. 2 is a schematic rear plan view showing a structure of a display device in a tablet display state in accordance with an embodiment of the present invention.
Figure 3:
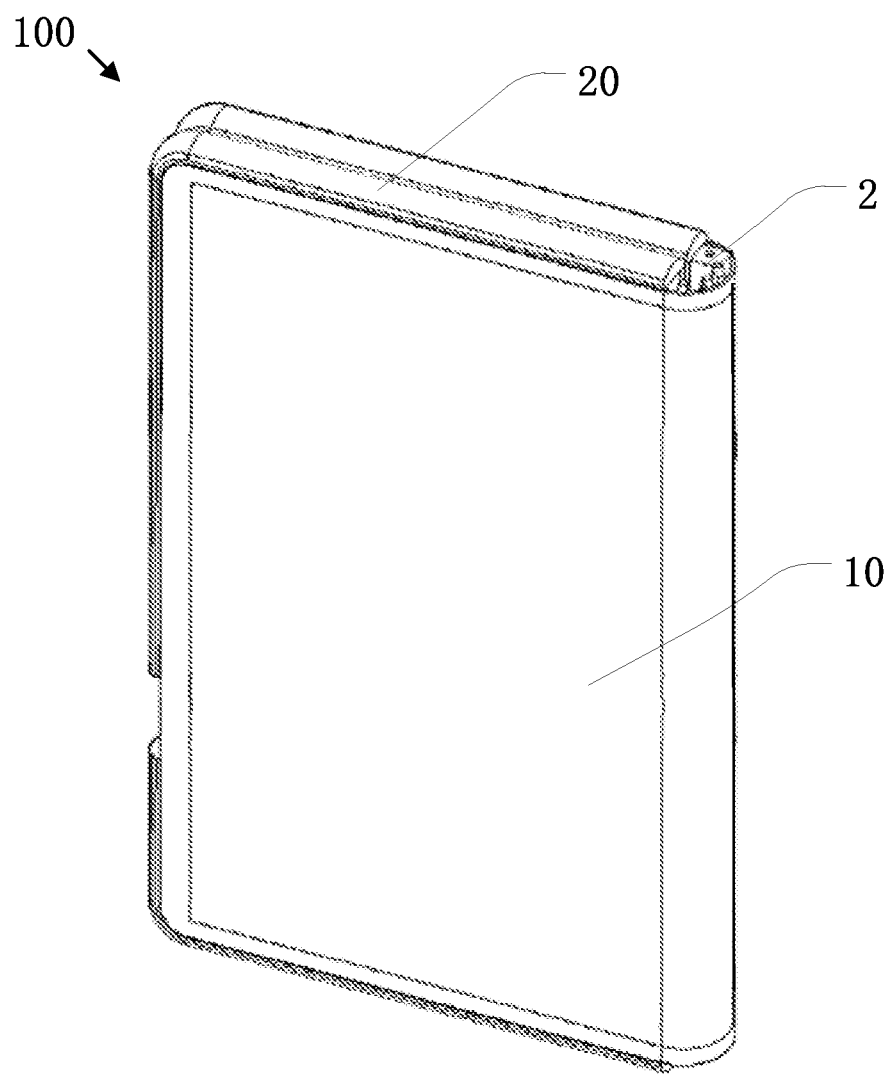
FIG. 3 is a schematic structural view of a display device in a mobile phone display state in accordance with an embodiment of the present invention.
Figure 4:
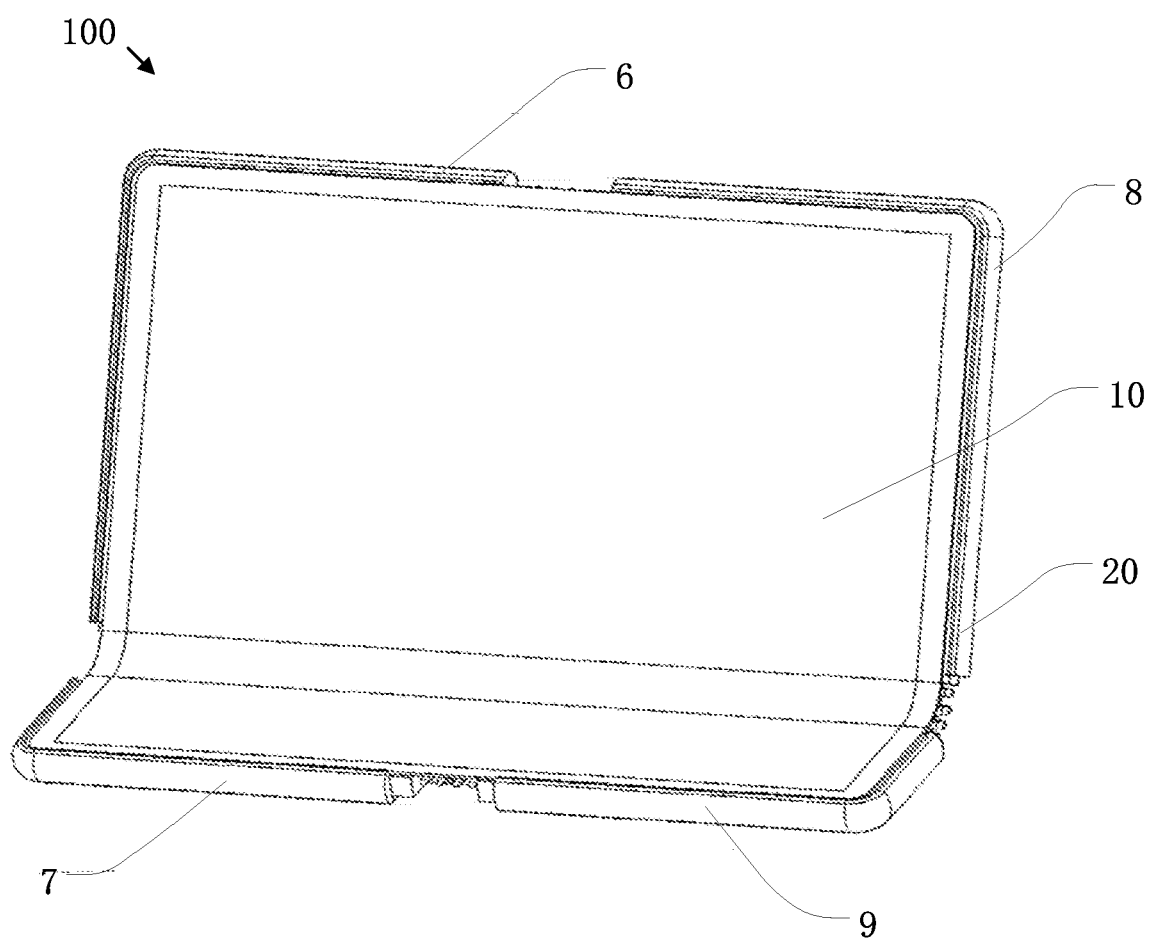
FIG. 4 is a schematic front plan view showing a structure of a display device in a notebook display state in accordance with an embodiment of the present invention.
Figure 5:
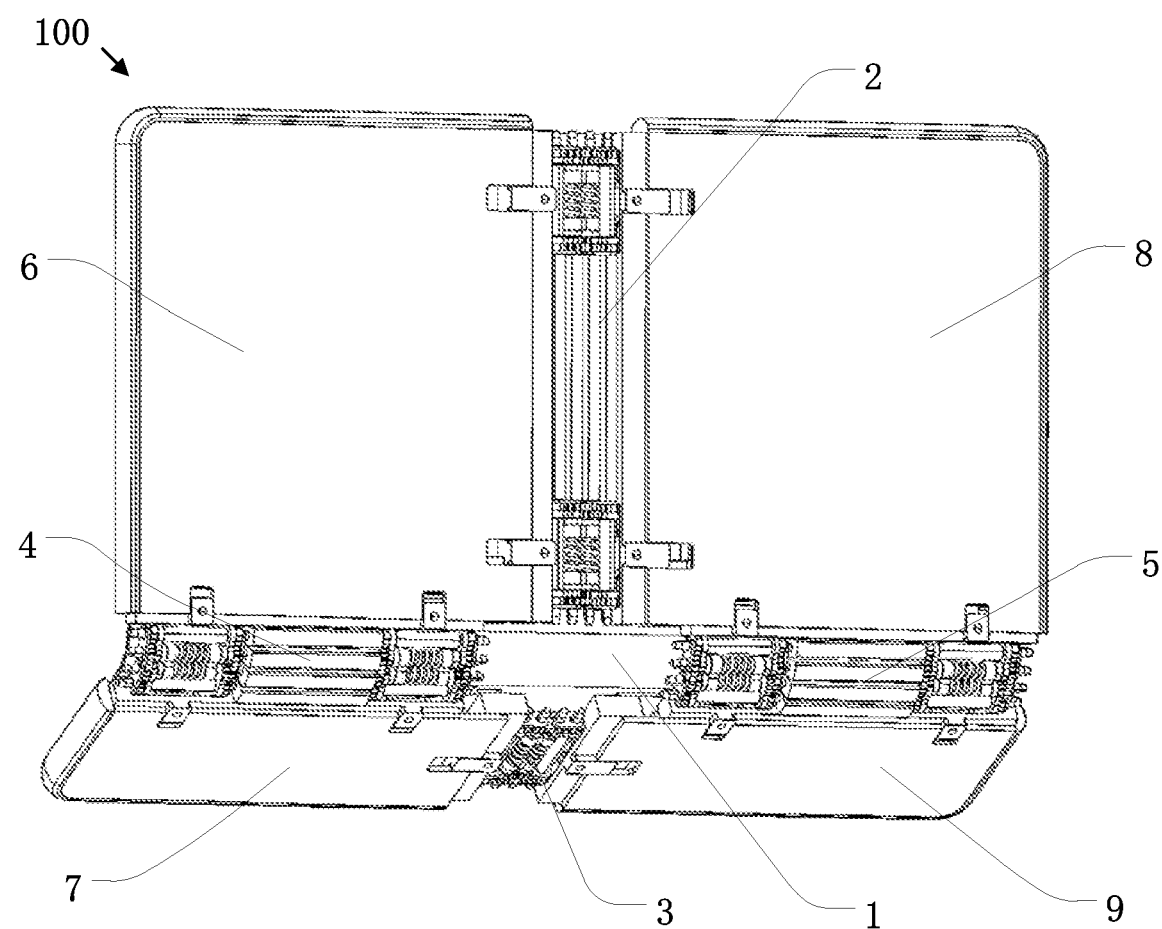
FIG. 5 is a schematic rear plan view showing a structure of a display device in a notebook display state in accordance with an embodiment of the present invention.

In the drawings, FIG. 1 is a schematic front plan view showing a structure of the display device 100 in a tablet display state in accordance with an embodiment of the present invention; FIG. 2 is a schematic rear plan view showing a structure of the display device 100 in a tablet display state in accordance with an embodiment of the present invention; FIG. 3 is a schematic structural view of the display device 100 in a mobile phone display state in accordance with an embodiment of the present invention; FIG. 4 is a schematic front plan view showing a structure of the display device 100 in a notebook display state in accordance with an embodiment of the present invention; and FIG. 5 is a schematic rear plan view showing a structure of the display device 100 in a notebook display state in accordance with an embodiment of the present invention.

Please refer to FIGS. 1 to 5. In an embodiment of the present invention, the foldable mechanism 10 includes a first folding hinge 2, a second folding hinge 3, a third folding hinge 4, a fourth folding hinge 5, a first casing 6, a second casing 7, a third casing 8, and a fourth casing 9.

Specifically, as shown in FIG. 2, the first folding hinge 2 is disposed along a first direction. The second folding hinge 3 is disposed in the same direction in which the first folding hinge 2 is disposed. The third folding hinge 7 is disposed along a second direction, wherein the second direction is different from the first direction. Preferably, the first direction is perpendicular to the second direction. The fourth folding hinge 5 is disposed in the same direction in which the third folding hinge 4 is disposed. The first casing 6 is pivotally connected to the first folding hinge 2 and the third folding hinge 4. The second casing 7 is pivotally connected to the second folding hinge 3 and the third folding hinge 4. The third casing 8 is pivotally connected to the first folding hinge 2 and the fourth folding hinge 5. The fourth casing 9 is pivotally connected to the second folding hinge 3 and the third folding hinge 4.

In this embodiment, the first folding hinge 2 and the second folding hinge 3 are spaced apart from each other. The third folding hinge 4 and the fourth folding hinge 5 are spaced apart from each other. A connection portion 1 or a gap 11 is provided at a location where the first direction and the second direction intersect each other.

In this embodiment, the connection portion 1 is a flexible connection block, and the flexible connection block is made of a material including a flexible metal or rubber, and is preferably made of flexible stainless steel, capable of deforming during bending and returning to an original shape, thereby to reduce stress and fill the gap 11 to provide a support function.

In this embodiment, the first folding hinge 2 has a length less than or equal to that of the first casing 6 or the third casing 8 extending in a direction along the first folding hinge 2. The second folding hinge 3 has a length less than or equal to that of the second casing 7 or the fourth casing 9 extending in a direction along the second folding hinge. The third folding hinge 4 has a length less than or equal to that of the first casing 6 or the second casing 7 extending in a direction along the third folding hinge 4. The fourth folding hinge 5 has a length less than or equal to that of the third casing 8 or the fourth casing 9 extending in a direction along the fourth folding hinge 5. Preferably, each of the first casing 6 and the third casing 8 has a length in a direction in which the first folding hinge 2 extends the same as that of the first folding hinge 2. Each of the second casing 7 and the fourth casing 9 has a length in a direction in which the second folding hinge 3 extends the same as that of the second folding hinge 3. Each of the first casing 6 and the second casing 7 has a length in a direction in which the third folding hinge 4 extends the same as that of the second folding hinge 3. Each of the third casing 8 and the fourth casing 9 has a length in a direction in which the fourth folding hinge 5 extends the same as that of the fourth folding hinge 5.

In this embodiment, the first folding hinge 2 and the second folding hinge 3 are configured to bend in a same direction, and the third folding hinge 4 and the fourth folding hinge 5 are configured to bend in a same direction. Specifically, the first folding hinge 2 and the second folding hinge 3 bend in a direction opposite to a direction in which the third folding hinge 4 and the fourth folding hinge 5 bend. Preferably, the first folding hinge 2 and the second folding hinge 3 bend inwardly, and the third folding hinge 4 and the fourth folding hinge 5 bend outwardly, or the bending directions may be reversed. In use, first, the first folding hinge 2 and the second folding hinge 3 are bent inwardly. Then, the third folding hinge 4 and the fourth folding hinge 5 are bent outwardly, so that a cross-shaped bending is completed. Certainly, the inward bending or the outward bending can be separately implemented.

In this embodiment, each of the first folding hinge 2, the second folding hinge 3, the third folding hinge 4, and the fourth folding hinge 5 includes a plurality of rotating shafts interconnected with each other. The rotating shafts are disposed in parallel with each other and are arranged in such a way that a transition arc is formed by the rotating shafts after the foldable mechanism bends. In this embodiment, there are four rotating shafts provided as a unit, wherein the two rotating shafts in a middle are coupled to each other, and upper and lower end portions of the two middle rotating shafts are hinged to the rotating shafts at outer sides, respectively. In this manner, a certain strength of torsion is generated at where they are hinged, and the two outer rotating shafts can pivotally rotate about the two middle rotating shafts and remain still at any positions without rotation. In another embodiment, there are three rotating shafts provided as a unit, wherein the rotating shaft in a middle is connected to the two rotating shafts at outer sides, such that they are structured in a manner similar to a manner the four rotating shafts are structured, wherein a difference from the embodiment of the four rotating shafts lies in that the upper and lower end portions of the middle rotating shafts can be better hinged to the two outer side rotating shafts, while in the embodiment of the three rotating shafts, they are staggered with respect to each other at locations where they are hinged. In another embodiment, there are two rotating shafts provided as a unit, wherein the two rotating shafts are hinged to each other and rotatable with respect to each other, thereby also achieving the same effect as described above. A manner of how the two rotating shafts are hinged may be referred to that of the three rotating shafts as described above. It should be noted that the more the rotating shafts are provided, the smoother the transition arc formed in a bending area is after bending.

In this embodiment, a bending angle of each of the first folding hinge 2, the second folding hinge 3, the third folding hinge 4, and the fourth folding hinge 5 is 360 degrees, preferably between 90 and 170 degrees. When the bending angles of the first folding hinge 2, the second folding hinge 3, the third folding hinge 4, and the fourth folding hinge 5 are not limited, they can all achieve inward folding and outward folding functions, thereby achieving a cross-shaped bending, or separately fulfilling an inward bending or an outward bending.

In this embodiment, each of the first folding hinge 2, the second folding hinge 3, the third folding hinge 4, and the fourth folding hinge 5 has torsion against gravity of each of the first casing 6, the second casing 7, the third casing 8, and the fourth casing 9, so that the first casing 6, the second casing 7, the third casing 8, and the fourth casing 9 remain positions relative to each other after the foldable mechanism is bent, thereby improving user experience.

An embodiment of the present invention further provides a display device 100, including the above-mentioned foldable mechanism 10. In addition, the display device 100 further includes a flexible display 20 disposed on at least a surface of the foldable mechanism 10. Preferably, the flexible display 20 may be disposed on each of two opposite side surfaces of the foldable mechanism 10, so that dual-side displaying can be achieved. Given below is to describe in detail in conjunction with the specific structure of the foldable mechanism 10 for three display states of the display device 100: a tablet display state, a mobile phone display state, and a notebook display state.

Please refer to FIGS. 1 and 2. In this embodiment, when the first folding hinge 2, the second folding hinge 3, the third folding hinge 4, and the fourth folding hinge 5 all remain in a flat state, the flexible display 20 is in the tablet display state. In the "tablet display state", the first folding hinge 2, the second folding hinge 3, the third folding hinge 4, and the fourth folding hinge 5 of the foldable mechanism 10 are all in the flat state. Upper surfaces of the first casing 6, the second casing 7, the third casing 8, and the fourth casing 9 are coplanar with one another on a same plane, such that the flexible display 20 is attached to the upper surfaces of the four casings, and the four casings are configured to support the flexible display 20.

Pleas refer to FIG. 3. When the first folding hinge 2 and the second folding hinge 3 are in the flat state and the third folding hinge 4 and the fourth holding hinge 5 are bent outwardly, such that the first casing 6 and the second casing 7 are folded up to be attached to each other and the third casing and the fourth casing are folded up to be attached to each other, the flexible display 20 is provided in a dual-screen mobile phone display state. At this time, size of peripheral edges of the display device is reduced by half, which is convenient for carrying and improves user experience.

Please refer to FIGS. 4 and 5. When the first folding hinge 2 and the second folding hinge 3 are bent inwardly and the third folding hinge 4 and the fourth folding hinge 5 remain in the flat state, the flexible display 20 is in the notebook display state, wherein the flexible display 20 corresponding to the first casing 6 and the second casing 7 is provided to display a virtual keyboard functioning as a keyboard for "a notebook". Additionally, the flexible display 20 corresponding to the third casing 8 and the fourth casing 9 is provided for image displaying, which functions as a display for the "notebook". The "notebook" keyboard signal input can be implemented by hand touching the virtual keyboard.

In this embodiment, an angle sensor (not shown) is further provided in each of the first folding hinge 2 and the second folding hinge 3. When the first folding hinge 2 and the second folding hinge 3 are bent from the tablet display state to the notebook display state, that is, when the first folding hinge 2 and the second folding hinge 3 are bent from 180 degrees to 170 degrees or less, the angle sensors are configured to transmit a control signal to the flexible display 20, so that the flexible display 20 corresponding to the first casing 6 and the second casing 7 is provided to display the virtual keyboard.

The present invention has advantages as follows: the present invention provides a foldable mechanism and a display device. The foldable mechanism has both inward bending and outward bending functions, so that the display device can operate in three display states: a tablet display state, a mobile phone display state, and a notebook display state. The foldable mechanism increases the diversity of use modes and is configured with less components and a simple structure so that users' requirements for multi-angle bending of the display device can be met, thereby fulfilling multi-functional applications and improving user experience.

The above are only the preferred embodiments of the present invention. It should be noted that for those of ordinary skill in the art, without departing from the principle of the present invention, various improvements and modifications can be made, and these improvements and modifications should also be construed as the protection scope of the present invention.

What is claimed is:

1. A foldable mechanism, comprising:
   a first folding hinge disposed along a first direction;
   a second folding hinge disposed in the same direction in which the first folding hinge is disposed;
   a third folding hinge disposed along a second direction, wherein the second direction intersects the first direction;
   a fourth folding hinge disposed in the same direction in which the third folding hinge is disposed;
   a first casing pivotally connected to the first folding hinge and the third folding hinge;
   a second casing pivotally connected to the second folding hinge and the third folding hinge;
   a third casing pivotally connected to the first folding hinge and the fourth folding hinge; and
   a fourth casing pivotally connected to the second folding hinge and the fourth folding hinge,
   wherein each of the first folding hinge, the second folding hinge, the third folding hinge, and the fourth folding hinge comprises a plurality of rotating shafts interconnected with each other, wherein the rotating shafts are disposed in parallel with each other and are arranged in such a way that a transition arc is formed by the rotating shafts after the foldable mechanism bends.

2. The foldable mechanism of claim 1, wherein the first folding hinge and the second folding hinge are spaced apart from each other, the third folding hinge and the fourth folding hinge are spaced apart from each other, and a connection portion or a gap is provided at a location where the first direction and the second direction intersect each other.

3. The foldable mechanism of claim 2, wherein the connection portion is a flexible connection block, and the flexible connection block is made of a material comprising a flexible metal or rubber.

4. The foldable mechanism of claim 1, wherein the first folding hinge has a length less than or equal to that of the first casing or the third casing extending in a direction along the first folding hinge;
   the second folding hinge has a length less than or equal to that of the second casing or the fourth casing extending in a direction along the second folding hinge;
   the third folding hinge has a length less than or equal to that of the first casing or the second casing extending in a direction along the third folding hinge; and
   the fourth folding hinge has a length less than or equal to that of the third casing or the fourth casing extending in a direction along the fourth folding hinge.

5. The foldable mechanism of claim 1, wherein the first folding hinge and the second folding hinge are configured to bend in a same direction, and the third folding hinge and the fourth folding hinge are configured to bend in a same direction.

6. The foldable mechanism of claim 1, wherein a bending angle of each of the first folding hinge, the second folding hinge, the third folding hinge, and the fourth folding hinge ranges from 90 to 170 degrees.

7. A display device, comprising the foldable mechanism of claim 1.

8. The display device of claim 7, further comprising:
   a flexible display disposed on at least a surface of the foldable mechanism;
   wherein the flexible display is provided in a tablet display state when the first folding hinge, the second folding hinge, the third folding hinge, and the fourth folding hinge are in a flat state;
   the flexible display is provided in a dual-screen mobile phone display state when the first folding hinge and the second folding hinge are in the flat state and the third folding hinge and the fourth holding hinge are bent outwardly, such that the first casing and the second casing are folded up to be attached to each other and the third casing and the fourth casing are folded up to be attached to each other; and
   the flexible display is provided in a notebook display state when the first folding hinge and the second folding hinge are bent inwardly and the third folding hinge and the fourth folding hinge are in the flat state, wherein the flexible display corresponding to the first casing and the second casing is provided to display a virtual keyboard, and the flexible display corresponding to the third casing and the fourth casing is provided for image displaying.

9. The display device of claim 7, wherein an angle sensor is provided in each of the first folding hinge and the second folding hinge, wherein when the first folding hinge and the second folding hinge are bent from the tablet display state to the notebook display state, the angle sensors are configured to transmit a control signal to the flexible display, so that the flexible display corresponding to the first casing and the second casing is provided to display the virtual keyboard.

10. A foldable mechanism, comprising:
    a first folding hinge disposed along a first direction;
    a second folding hinge disposed in the same direction in which the first folding hinge is disposed;
    a third folding hinge disposed along a second direction, wherein the second direction intersects the first direction;
    a fourth folding hinge disposed in the same direction in which the third folding hinge is disposed;
    a first casing pivotally connected to the first folding hinge and the third folding hinge;
    a second casing pivotally connected to the second folding hinge and the third folding hinge;
    a third casing pivotally connected to the first folding hinge and the fourth folding hinge; and
    a fourth casing pivotally connected to the second folding hinge and the fourth folding hinge,
    wherein each of the first folding hinge, the second folding hinge, the third folding hinge, and the fourth folding hinge has torsion against gravity of each of the first casing, the second casing, the third casing, and the fourth casing, so that the first casing, the second casing, the third casing, and the fourth casing remain positions relative to each other after the foldable mechanism is bent.

11. The foldable mechanism of claim 10, wherein the first folding hinge and the second folding hinge are spaced apart from each other, the third folding hinge and the fourth folding hinge are spaced apart from each other, and a connection portion or a gap is provided at a location where the first direction and the second direction intersect each other.

12. The foldable mechanism of claim 11, wherein the connection portion is a flexible connection block, and the flexible connection block is made of a material comprising a flexible metal or rubber.

13. The foldable mechanism of claim 10, wherein the first folding hinge has a length less than or equal to that of the first casing or the third casing extending in a direction along the first folding hinge;
the second folding hinge has a length less than or equal to that of the second casing or the fourth casing extending in a direction along the second folding hinge;
the third folding hinge has a length less than or equal to that of the first casing or the second casing extending in a direction along the third folding hinge; and
the fourth folding hinge has a length less than or equal to that of the third casing or the fourth casing extending in a direction along the fourth folding hinge.

14. The foldable mechanism of claim 10, wherein the first folding hinge and the second folding hinge are configured to bend in a same direction, and the third folding hinge and the fourth folding hinge are configured to bend in a same direction.

15. The foldable mechanism of claim 10, wherein a bending angle of each of the first folding hinge, the second folding hinge, the third folding hinge, and the fourth folding hinge ranges from 90 to 170 degrees.

16. A display device, comprising the foldable mechanism of claim 10.

17. The display device of claim 16, further comprising:
a flexible display disposed on at least a surface of the foldable mechanism;
wherein the flexible display is provided in a tablet display state when the first folding hinge, the second folding hinge, the third folding hinge, and the fourth folding hinge are in a flat state;
the flexible display is provided in a dual-screen mobile phone display state when the first folding hinge and the second folding hinge are in the flat state and the third folding hinge and the fourth holding hinge are bent outwardly, such that the first casing and the second casing are folded up to be attached to each other and the third casing and the fourth casing are folded up to be attached to each other; and
the flexible display is provided in a notebook display state when the first folding hinge and the second folding hinge are bent inwardly and the third folding hinge and the fourth folding hinge are in the flat state, wherein the flexible display corresponding to the first casing and the second casing is provided to display a virtual keyboard, and the flexible display corresponding to the third casing and the fourth casing is provided for image displaying.

18. The display device of claim 16, wherein an angle sensor is provided in each of the first folding hinge and the second folding hinge, wherein when the first folding hinge and the second folding hinge are bent from the tablet display state to the notebook display state, the angle sensors are configured to transmit a control signal to the flexible display, so that the flexible display corresponding to the first casing and the second casing is provided to display the virtual keyboard.

* * * * *